United States Patent Office 3,313,748
Patented Apr. 11, 1967

3,313,748
RUBBERY POLYMERS CONTAINING CROSS-LINKED ORGANIC POLYMERS
Oliver W. Burke, Jr., 506 Intracoastal Drive,
Fort Lauderdale, Fla. 33304
No Drawing. Filed Aug. 31, 1960, Ser. No. 53,067
2 Claims. (Cl. 260—4)

This invention relates to an improved process for making organic filler material in aqueous dispersion, and the improved products stemming therefrom.

It is known that an organic filler material (the so-called vinylic filler material, consisting essentially of individual cross-linked polymer particles in the colloidal size range of about 5 millimicrons to about 0.5 micron diameter, which individual particles are themselves non-soluble in organic solvents) can be prepared by one or more polymerization steps at least one of which is a cross-linking polymerization in aqueous dispersion of at least one monomer material selected from the class consisting of group (A) cross-linking monomers containing a plurality of polymerizable $>C=C<$ groups and group (B) monomers containing a single polymerizable $>C=C<$ group, said selected monomer material comprising at least one monomer selected from the group (A) and said particles being cross-linked thereby to the said non-soluble form.

When vinylic filler material particles have on their surfaces a coloring component then such are referred to as vinylic pigments. Vinylic fillers and vinylic pigments can be employed to reinforce organic elastic and plastic materials including natural rubber and its derivatives. In addition to their use with polymeric materials, such fillers may further be employed to harden waxes, to gel lubricants thus forming greases and in other uses such as combining with film forming materials including drying and non-drying polyelectrolytes. It is sometimes difficult to prepare vinylic filler aqueous dispersions free of prefloc or polymer coagulum.

It is an object of the present invention to provide a process for the preparation of vinylic filler material in aqueous dispersions free of polymer coagulum referred to as prefloc or precoagulum.

The above object is accomplished by this invention, which consists in polymerizing monomer material, consisting at least in part of potentially cross-linking monomer material containing a plurality of polymerizable $>C=C<$ groups and conducting said polymerization in at least two polymerization steps, the first polymerization step being essentially a non-cross-linking polymerization step and a following polymerization step being a cross-linking polymerization step.

The preparation and use of vinylic fillers and vinylic pigments have been described in the following patent applications and patents: U.S. application 378,735 filed Sept. 8, 1953 entitled, "Vinylic Fillers and the Reinforcement of Elastic and Plastic Materials Therewith," issued in France, Oct. 15, 1957, as French Patent No. 1,144,575, issued in Great Britain July 30, 1958 as British Patent No. 799,043; said U.S. application having been abandoned in favor of U.S. patent application 795,881 filed Feb. 20, 1959 and now abandoned, which is a continuation-in-part of the above referred to U.S. application 378,735; U.S. patent application 538,728 filed Oct. 5, 1955 and now abandoned, entitled, "Graft Vinylic Fillers and Their Uses," issued in France Oct. 2, 1958, as French Patent No. 1,163,886; U.S. application No. 462,611, which was filed Oct. 15, 1954 and now abandoned, entitled, "Vinylic Filler Pigments," issued in France May 6, 1957, as French Patent No. 1,135,872, issued in Canada Aug. 25, 1959, as Canadian Patent No. 581,823; and the subject matter of these patent applications and patents which relates to the present invention is included herein by reference.

The preparation of colloidal polymer particles including vinylic fillers with the aid of a polymeric emulsifier is further set forth in U.S. application No. 53,068 filed Aug. 31, 1960, and now abandoned, entitled, "Vinylic Fillers Prepared With Polymeric Emulsifiers and Uses Thereof" (Case V-PE) which is made a part hereof by reference.

The line of division between these cases is that case V-PE is specific to the employment of a polymeric emulsifier to form vinylic filler particles, while the present case is specific to the formation of vinylic fillers by multi-step emulsion polymerization, in which the first step is a non-cross linking emulsion polymerization step followed by a cross-linking emulsion polymerization step, and when polymeric emulsifiers are employed for effecting the emulsification in this multi-step polymerization then such procedure is an improvement over use thereof for forming vinylic filler in a single step emulsion polymerization.

In the emulsion polymerization of a monomer which is only slightly soluble in water the unreacted monomer is present as a separate (oil) phase during the earlier part of the polymerization. Usually monomer materials have a vapor pressure at the polymerization temperature, and the vapor pressure of the system remains constant until the monomer phase disappears by solution thereof in the polymer particles. The disappearance of the monomer phase is thus made evident by an abrupt (discontinuous) decrease in vapor pressure; it being immaterial whether the unreacted monomer material is emulsified or not. It was found that in the emulsion polymerization of butadiene using the standard persulfate recipe at 50° C. the separate monomer phase disappears at about 52% conversion see FIG. VIII-8, page 260 of the treatise entitled, "Emulsion Polymerization" by F. A. Bovey, I. M. Kolthoff, A. I. Medalia, E. J. Meehan, published in 1955 by Interscience Publishers, Inc., New York.

In the preparation of vinylic fillers when the emulsion cross-linking polymerization reaction takes place toward the end of the polymerization then formation of prefloc or polymer coagulum occurs only to a small extent or not at all. However, if cross-linking occurs at low conversions of monomers then precoagulum is very liable to occur. The polymer latex particle is the principal locus of polymerization and if the polymer latex particle is highly cross-linked and not capable of swelling with monomers than the monomer material may polymerize on the surface of the polymer particle entrapping the emulsifier and thus causing the particles to prefloc; that is form considerably polymer precoagulum.

According to this invention if the polymerization is carried out so that the cross-linking reaction takes place principally after the separate monomer (oil) phase has disappeared, and in the case low boiling monomers are present the monomer vapor pressure has begun to drop, that is during the latter half of the polymerization reaction then prefloc does not form and a stable latex of vinylic filler is obtained. One method of producing a stable latex is to withhold the cross-linking monomer to the latter half of the emulsion polymerization cycle and this method is taught in U.S. application 538,728 filed Oct. 5, 1955 and the issued French Patent No. 1,163,886; however, this procedure does not give as dense a cross-linked vinylic filler polymer particle as only a part of the polymer material is cross-linked. In the present invention, monomer material containing a plurality of polymerizable $>$C$=$C$<$ grops is present during the first part as well as the latter part of the emulsion polymerization, however, during the first part of the polymerization the catalyst system is chosen to polymerize only one of the $>$C$=$C$<$ groups of the monomer having a plurality of $>$C$=$C$<$ groups and then after the separate monomer (oil) phase has disappeared, then a second catalyst is added which will ensure that cross-linking polymerization takes place during the latter part of the emulsion polymerization.

The catalyst system chosen during the first part of the emulsion polymerization is chosen to minimize or eliminate the free radicals in the oil phase and to maximize the free radicals in the aqueous phase and at the monomer-water interface and thus monomers having a plurality of $>$C$=$C$<$ groups polymerize in the first part of the polymerization as though such monomers only had a single $>$C$=$C$<$ group. This type of polymerization yields polymers soluble in polymer solvents and is best effected by employing a water soluble free-radical generating catalyst which includes water soluble redox catalyst systems with or without modifiers. If an oil soluble catalyst is employed in the first part of the polymerization then the balance between catalyst and modifier must be such as to prevent or minimize cross-linking. In the latter half or part of the polymerization, a monomer soluble catalyst or redox system is added to assure that cross-linking polymerization takes place and the vinylic filler in aqueous dispersion is formed free of prefloc.

The patent art teaches that monomer having a plurality of $>$C$=$C$<$ groups can be made to polymerize so as to yield soluble non-cross-linked polymers even when employing an oil soluble catalyst in bulk e.g. U.S. Patent No. 1,811,078 Example 1 which states: "A mixture containing 100 parts of divinyl benzene, 200 parts of xylene and two parts benzoyl peroxide was refluxed for four hours. The mixture was then poured into about 1000 parts of alcohol which caused 50 parts of polymerized divinyl benzene to separate as a white powder. The polymer was readily soluble in esters and in aromatic hydrocarbons." For further examples of soluble polymers from monomers having a plurality of $>$C$=$C$<$ groups, see D'Alelio's U.S. Patents Nos. 2,378,195, 2,378,196, 2,378,197 and 2,363,836.

In emulsion polymerization butadiene polymerizes about 20% 1,2-configuration and the remainder 1,4-configuration (see E. J. Hart and A. W. Meyer, J. Amer. Chem. Soc. 75, 1980 (1949) and A. W. Meyer, Ind. Eng. Chem., 41, 1570 (1949)) thus 20% of butadiene polymerizes as though such monomer were a non-conjugated divinyl monomer.

It is known in the synthetic rubber polymerization art that butadiene can be 100% emulsion polymerized to yield soluble polymers (see page 282 of G. R. Whitby's treatise entitled, "Synthetic Rubber," published in 1954 by John Wiley and Sons, New York). Synthetic rubber emulsion polymerization recipes, which polymerize only a single $>$C$=$C$<$ group of the 20% of butadiene which polymerizes 1,2-configuration, can also be employed to emulsion polymerize a single $>$C$=$C$<$ groups of monomers having two or more double bonds which are not conjugated (see U.S. Patents Nos. 2,568,659 and 2,614,093).

In the present invention these non-cross-linking polymerization catalyst recipes in principle are employed in the first step to emulsion polymerize the monomer material having a plurality of $>$C$=$C$<$ groups to yield non-cross-linked polymer particles and in the second polymerization step cross-linking polymerization catalyst recipes are employed to polymerize the monomer material having a plurality of $>$C$=$C$<$ groups within the non-cross-linked polymer particles thus converting such particles to cross-linked particles referred to as vinylic filler particles.

The process for the preparation of vinylic fillers according to this invention is carried out in the following manner and the limits set forth under A and B below are typical but are not to be considered as limiting:

A. SINGLE MONOMER CHARGE

| Step I.—Non-cross-linking polymerization: | Parts |
|---|---|
| Monomer material [1] | 100 |
| Water | 100–600 |
| Emulsifier [2] | 0–10 |
| Polymerization catalyst [3] | 0.02–2.0 |
| Modifier [4] | 0–2.0 |
| Polymerization temp. ° C. | 0–120 |
| Polymerization time, hrs. | 0.5–20 |
| Conversion, percent | 30–70 |
| Step II.—Cross-linking polymerization: | |
| Polymerization catalyst [5] | 0.02–5.0 |
| Polymerization temp. ° C. | 0–150 |
| Conversion, percent | 90–100 |

[1] The monomer material consists at least in part of monomers having a plurality of $>$C$=$C$<$ groups and such monomer material being at least in part other than conjugated diene monomer material and in order to assure that the resulting filler particles are rigid the polymerized conjugated diene monomer content should not exceed 22% by wt. (see page 42 lines 18–21 British Patent No. 799,043 made a part hereof by reference). For examples of the monomers employable herein—see French Patents 1,144,575, 1,163,886 and 1,135,872 and corresponding British Patent No. 799,043 and Canadian Patent 581,823 made a part hereof by reference.

[2] The emulsifier employed may be any emulsifier suitable for emulsion polymerization (see British Patent 799,043) or may be a polymeric emulsifier of natural or synthetic origin (see British Patent 799,043 and French Patent 1,163,886 made a part hereof by reference).

[3] The catalyst employed in this emulsion polymerization may be one of the following; (a) water soluble peroxygen compound, such as alkali metal or ammonium persulfate, perborate, percarbonate or hydrogen peroxide with or without a reducing agent such as a water soluble sulfite, e.g. sodium sulfite; which catalysts are preferred for the non-cross-linking polymerization step; (b) monomer soluble catalysts such as an aliphatic azo compound such as azobis(isobutyronitrile), or may be a diazothioether such as p-methoxyphenyldiazothio-2-naphthyl ether, or may be an organic peroxygen compound such as an organic hydroperoxide or peroxide such as cumene hydroperoxide, or dibutyl peroxide and such peroxygen compounds can be employed with a reducing agent to form the free radicals which catalysts are preferred for the cross-linking polymerization step. Even the water soluble peroxygen compounds can form cross linked polymers from monomers having a plurality of $>$C$=$C$<$ groups provided the molecular weight of the polymer becomes sufficiently great and this can be avoided by controlling the amount of catalyst in relation to the emulsifier or by employing a modifier. The monomer soluble peroxygen compounds easily polymerize monomers having a plurality of $>$C$=$C$<$ groups to cross-linked polymers; however, by employing sufficient modifier then soluble polymers can be obtained (see particularly chapters III and IV of E. A. Bovey et al. treatise entitled, "Emulsion Polymerization" published in 1955 by Interscience Publishers Inc., New York, which describe the methods employed in making non-cross-linked synthetic rubber latices).

[4] The modifiers, that is chain-transfer agents, include those materials employed for this purpose in the technical and patent literature, and include mercaptans, mercaptan derivatives, organic disulfides, thioxanthates, mercaptothiazoles and many other organic sulfur compounds (see chapter IV of the E. A. Bovey et al. book entitled, "Emulsion Polymerization" referred to heretofore).

[5] The further polymerization catalyst in this cross-linking polymerization step is a monomer soluble organic free radical generating catalyst and include those set forth under 3(b) heretofore and include the peroxygen compound employed per se or employed with a monomer soluble organic reducing agent. The organic peroxygen compound may be mono-, di- or poly-hydroperoxide or peroxide or may be a mixture of such organic peroxygen compounds. As the polymerization temperature is raised when employing peroxygen catalyst compounds the tendency usually to form more highly cross-linked vinylic fillers particles increases.

For catalysts employable herein see the patents cited under footnote 1 hereof.

B. MULTIPLE CHARGING OF MONOMERS

*Step I.*—Non-cross-linking polymerization: Same materials as Step I under A except that the conversion of the monomers to polymer may be interrupted or permitted to go to completion.

*Step II.*—Cross-linking polymerization:

| | Parts |
|---|---|
| Monomer material [6] | 20–120 |
| Emulsifier [7] | 0–10 |
| Polymerization catalyst [8] | 0.02–5.0 |
| Polymerization temp. ° C. | 0–150 |
| Conversion, percent | 90–100 |

[6] Same as footnote 1 under A above.
[7] Same as footnote 2 under A above.
[8] Same as footnote 5 under A above.

The preparation of the products in accordance with this invention will now be described in greater detail in the following examples which are understood as illustrative of the invention rather than limiting.

Examples

Typical vinylic fillers illustrative of those set forth in U.S. application 378,736 filed Sept. 18, 1953 and issued French Patent No. 1,144,575 and British Patent No. 799,043 heretofore referred to, are set out hereafter in Table I together with viscosity data to show such vinylic fillers are cross-linked. When a vinylic filler e.g., 0.5 g. dry vinylic filler is suspended in diluent e.g., 15 ml. of diluent (that is solvent for similar polymers not cross-linked) then the viscosity of the diluent is not effected or only slightly effected by the presence of the vinylic filler, however, when the polymer particle is not cross-linked then such polymer has a pronounced effect on viscosity of the diluent and the flow time in the modified Ostwald viscosimeter is increased 3–6 times more or less over the flow time of the diluent alone.

Vinylic fillers are set forth in Table I for comparative purposes, it is to be noted that when a monomer soluble catalyst is employed with or without small quantities of modifier as in Examples A, B and C then cross-linking is usually assured.

TABLE I.—VINYLIC FILLER COMPARISON EXAMPLES (CROSS-LINKED)

| | Example Comparison | | |
|---|---|---|---|
| | A | B | C |
| Experiment IX- | 4 | 61A | 62A |
| Polymerization Formulation: | | | |
| Styrene, g. | 80 | 80 | 80 |
| Divinylbenzene (50%),[1] g. | 20 | 20 | 20 |
| Water, ml. | 300 | 300 | 300 |
| C$_{10}$ to C$_{18}$ alkyl sodium sulfate,[2] g. | 10 | | |
| Alkylaryl sodium sulfonate,[3] g. | | 10 | |
| Sodium salt of dodecyl alcohol sulfate,[4] g. | | | 10 |
| Catalyst and Modifier: | | | |
| Diisopropylbenzene-hydroperoxide, g. | 1.25 | 1.0 | |
| Azobis (isobutyronitrile), g. | | | 1.5 |
| Tert.-dodecyl mercaptan | | 0.075 | |
| Potassium chloride | | 0.5 | 0.5 |
| Potassium pyrophosphate | 0.21 | 0.21 | |
| Ferrous sulfate | 0.19 | 0.19 | |
| Polymerization Procedure: | | | |
| Temp., ° C. | 60 | 50 | 50 |
| Time, hrs. | 18 | 18 | 18 |
| Total solids of latex, percent by wt. | 25.6 | 26.5 | 25.3 |
| Conversion, percent by wt. | 96 | 100 | 94 |
| Viscosity Determination (polymer in dimethylformamide): | | | |
| Dry polymer, g. | 0.5 | 0.5 | 0.5 |
| Dimethylformamide, ml. | 15 | 15 | 15 |
| Flow rate (modified Ostwald Viscosimeter ASTM): | | | |
| Dimethylformamdie flow rate sec. (25° C.) | 77 | 77 | 77 |
| Polymer and dimethylformamide flow rate sec. (25° C.) | 87 | 89 | 85 |
| Polymer (insoluble=I) | I | I | I |

[1] Commercial.
[2] Mersolate, a commercial trade-marked product.
[3] Santomerse S-3, a commercial trade-marked product.
[4] Duponol ME, a trade-marked product.

For further comparative purposes, it is shown in Table II that comparative examples D, E and F comprising methyl methacrylate emulsion polymerized with or without butadiene or allyl methacrylate present give non-cross-linked polymer particles (e.g., polymer particles soluble in dimethylformamide) when polymerized in a typical recipe employed to produce butadiene-styrene type elastomers employing potassium persulfate as the water soluble catalyst. These soluble polymers in the amount of 0.5 g. in dimethylformamide increased the flow time of the dimethylformamide about 3 times.

TABLE II.—POLYMER COMPARISON EXAMPLES (NON CROSS-LINKED)

| | Examples Comparison | | |
|---|---|---|---|
| | D | E | F |
| Experiment No. IX- | 227B | 151B | 218A |
| Polymerization Formulation: | | | |
| Methyl methacrylate, g. | 100 | 90 | 80 |
| Butadiene-1,3, g. | | 10 | |
| Allyl methacrylate, g. | | | 20 |
| Water, ml. | 300 | 300 | 300 |
| Soap,[1] g. | 10 | 10 | 10 |
| Potassium persulfate, g. | 0.5 | 0.2 | 0.2 |
| n-Dodecyl mercaptan, ml. | 0.85 | 0.85 | 1.0 |
| Polymerization Procedure: | | | |
| Temp. ° C. | 50 | 50 | 50 |
| Time, hrs. | 19 | 12.5 | 13 |
| Total solids of latex, percent by wt. | 26.5 | 26.5 | 24.5 |
| Conversion, percent by wt. | 100 | 98.5 | 91 |
| Viscosity Determination (polymer in dimethylformamide): | | | |
| Dry polymer, g. | 0.5 | 0.5 | 0.5 |
| Dimethylformamide, ml. | 15 | 15 | 15 |
| Flow rate (modified Ostwald Viscosimeter ASTM): | | | |
| Dimethylformamide flow rate sec. (25° C.) | 72 | 72 | 72 |
| Polymer-dimethylformamide flow rate sec. (25° C.) | 213 | 262 | 202 |
| Polymer (soluble=S) | S | S | S |

[1] Sodium soap of partially hydrogenated tallow (Office of Rubber Reserve Specification Soap).

Examples 1 thru 7 of Table III teach in Step I the formation of non-cross-linked soluble polymer particles from latex recipes employing at several different concentrations monomer material and including monomers having a plurality of >C=C< groups. In these emulsion polymerization recipes the water soluble catalyst potassium persulfate was employed. In the Step II the non-cross-linked latex polymer particles from Step I were converted to cross-linked polymer particles with the aid of a monomer (oil) soluble catalyst. The polymer particles with residual vinylidenic or allylic unsaturation is swollen with monomers material comprising at least in part monomer having a plurality of >C=C< groups and polymerized with the aid of a polymer-monomer soluble catalyst. In Examples 1 to 7 the vinylic filler latex produced was free of precoagulum.

The polymer particles of Step I Examples 1 thru 7 are soluble in solvents for such polymers, e.g., toluene and dimethylformamide. The polymers particles from Step I when further treated with monomer and a monomer-polymer soluble catalyst are converted to insoluble polymer particles of the required colloidal size range (vinylic filler particles) as is illustrated by the non-solubility of these cross-linked particles in toluene and dimethylformamide.

TABLE III.—PREPARATION COPOLYMER LATICES

[Step I—Copolymers Non-Cross-Linked]

| | Example No. | | | | | | |
|---|---|---|---|---|---|---|---|
| | -1 | -2 | -3 | -4 | -5 | -6 | -7 |
| Experiment No. IX- | 149G | 161A | 186A | 127A | 204B | 150D | 150E |
| Polymerization Formulation—Step I: | | | | | | | |
| Water, ml | 300 | 300 | 300 | 300 | 300 | 300 | 300 |
| Soap,[1] g | 10 | 10 | 10 | 10 | 10 | 10 | 10 |
| Styrene, g | 90 | 80 | 60 | 95 | 85 | 85 | 80 |
| Divinylbenzene (50%),[2] g | 10 | 20 | 40 | | | | |
| EGDA,[3] g | | | | 5 | 15 | | |
| Diallyl maleate, g | | | | | | 15 | 20 |
| n-Dodecyl mercaptan, ml | 0.85 | 0.42 | 0.85 | 0.15 | 0.07 | 0.42 | 0.42 |
| Potassium persulfate, g | 0.1 | 0.1 | 0.1 | 0.3 | 0.3 | 0.5 | 0.5 |
| Polymerization Procedure: | | | | | | | |
| Temp. °C | 50 | 50 | 50 | 50 | 50 | 50 | 50 |
| Time, hrs | 16 | 18 | 18 | 14 | 18 | 12 | 12 |
| Total solids, percent wt | 24.1 | 27.7 | 24.9 | 25.7 | 20.8 | 25.5 | 25.1 |
| Conversion, percent wt | 90 | 90 | 92 | 96 | 85 | 95 | 94 |
| Viscosity Determination (polymer in toluene): | | | | | | | |
| Dry polymer,* g | 0.5 | 0.5 | 0.5 | 0.5 | 0.5 | 0.5 | 0.5 |
| Toluene,* ml | 15 | 15 | 15 | 15 | 15 | 15 | 15 |
| Flow rate (modified Ostwald Viscosimeter ASTM): | | | | | | | |
| Toluene flow rate, sec. (25°C.) | 58.2 | 58.2 | 58.2 | 58.2 | 58.2 | 58.2 | 58.2 |
| Polymer and Toluene flow rate, sec. (25°C.) | 257 | 255 | 296 | 297 | 201 | 215 | 214 |
| Polymer (soluble=S) | S | S | S | S | S | S | S |

[1] Sodium soap of partially hydrogenated tallow.
[2] Commercial.
[3] EGDA = ethylene glycoldimethacrylate.
* Polymers and toluene shaken in bottles overnight.

TABLE III (CONCLUDED).—PREPARATION OF COPOLYMER LATICES

[Step II—Copolymers Cross-Linked]

| | Example No. | | | | | | |
|---|---|---|---|---|---|---|---|
| | -1 | -2 | -3 | -4 | -5 | -6 | -7 |
| Experiment No. XI-428 | -1 | -2 | -3 | -4 | -5 | -6 | -7 |
| Polymerization Formulation—Step II: | | | | | | | |
| Latex from Step I | X | X | X | X | X | X | X |
| Styrene, g | 15 | 5 | | 10 | 20 | 10 | |
| Divinylbenzene (50%),[1] g | 5 | 15 | 10 | 10 | | | |
| Diallyl maleate, g | | | | | 10 | | 5 |
| EGDA,[2] g | | | | | | 10 | |
| Cumene hydroperoxide, ml | 1.0 | | | 1.0 | | | |
| Diisopropylbenzene hydroperoxide, ml | | 0.5 | 1.5 | | 1.0 | | |
| Di-ter.-butyl peroxide, ml | | | 0.5 | | | 0.5 | |
| Dicumyl peroxide, g | | | | | | | 0.5 |
| Polymerization Conditions: | | | | | | | |
| Temp. °C | 50 | 50 | 50 | 50 | 50 | 50 | 50 |
| Time, hrs | 10 | 10 | 10 | 10 | 10 | 10 | 10 |
| Total solids, percent wt | 28.5 | 28.5 | 28.5 | 28.5 | 29.5 | 28.5 | 28.0 |
| Viscosity Determination (polymer in toluene): | | | | | | | |
| Dry polymer,* g | 0.5 | 0.5 | 0.5 | 0.5 | 0.5 | 0.5 | 0.5 |
| Toluene,* ml | 15 | 15 | 15 | 15 | 15 | 15 | 15 |
| Flow rate (modified Ostwald Viscosimeter ASTM): | | | | | | | |
| Toluene flow rate sec. (25.5°C.) | 43.5 | 43.5 | 43.5 | 43.5 | 43.5 | 43.5 | 43.5 |
| Polymer plus toluene flow rate sec. (25.5°C.) | 42.9 | 43.5 | 43.3 | 55.4 | 45.4 | 43.9 | 45.2 |
| Polymer (I=insoluble) | I | I | I | I | I | I | I |
| Viscosity Determination (polymer in dimethylformamide): | | | | | | | |
| Dry polymer,* g | 0.5 | 0.5 | 0.5 | 0.5 | 0.5 | 0.5 | 0.5 |
| Dimethylformamide,* ml | 15 | 15 | 15 | 15 | 15 | 15 | 15 |
| Flow rate (modified Ostwald Viscosimeter ASTM): | | | | | | | |
| Dimethylformamide flow rate sec. (25.5°C.) | 57.6 | 57.6 | 57.6 | 57.6 | 57.6 | 57.6 | 57.6 |
| DMF plus polymer flow rate sec. (25.5°C.) | 77.5 | 73.4 | 64.8 | 66.2 | 71.5 | 75.4 | 70 |
| Polymer (I=insoluble) | I | I | I | I | I | I | I |

[1] Commercial.
[2] EDGA = ethylene glycoldimethacrylate.
*Polymers and diluent shaken in bottles overnight.

Vinylic fillers prepared with polymeric emulsifiers are described in French Patents Nos. 1,144,575, 1,163,886, 1,135,872 and in U.S. applications 378,735 (Sept. 8, 1953), 795,881 (Feb. 20, 1959), 538,728 (Oct. 5, 1955), 462,611 (Oct. 15, 1954) and more particularly set out in U.S. application No. 53,068, filed Aug. 31, 1960 entitled, "Vinylic Fillers Prepared with Polymeric Emulsifiers and Uses Thereof" (Case V-PE) which are hereof a part by reference. In these cited patents and applications I have described the preparation of vinylic fillers using polymeric emulsifiers including the quantities and types of monomers and catalysts and the methods of producing the polymeric emulsifiers.

The examples 8 through 11 of Table IV teach the preparation of vinylic fillers with the aid of a polymeric emulsifier and the polymerization of the vinylic filler is conducted in two steps. Step I produces polymer particles which are soluble and therefore non-cross-linked while Step II with the aid of further monomer material having a plurality of $>C=C<$ groups and a monomer soluble catalyst converts the soluble polymer particles into insoluble vinylic filler particles without forming precoagulum.

In comparative examples G and H and in Examples 8 through 11 the polymeric emulsifier was prepared by dissolving 2.75 kg. of maleic anhydride, 2.75 kg. of styrene, 111 g. of acrylonitrile, 33 g. benzoyl peroxide in 27.5 kg. of toluene and heating 15 hours at 70° C. and filtering and drying the resulting polymer.

For comparative purposes examples G and H Table IV teach that if in Step I a monomer soluble catalyst is employed some precoagulum is already formed in Step I while in Step II a considerable additional precoagulum forms. Thus comparative examples G and H when compared with Examples 9 through 11 of Table IV clearly set forth the advantages of the process herein described for producing vinylic fillers free of precoagulum.

blend is diluted with an equal volume of water and creamed with 100 ml. of saturated sodium chloride solution and coagulated with 1 liter of 2% sulfuric acid aqueous solution. The coagulum is washed with water twice and dried in a warm air oven at 70° C. The compounds and vulcanizates of this natural rubber-vinylic

TABLE IV.—PREPARATION OF VINYLIC FILLERS

|  | Example No. | | | | | |
|---|---|---|---|---|---|---|
|  | -G | -H | -8 | -9 | -10 | -11 |
| Experiment No. XII- | 17 | 19 | 24 | 27 | 38 | 39 |
| Water, liter* | 12 | 12 | 12 | 12 | 12 | 12 |
| Polymeric emulsifier, g.[1] | 200 | 200 | 200 | 200 | 200 | 200 |
| Sodium salt dodecyl alcohol sulfate, [2] g | 6 | 6 | 6 | 6 | 6 | 6 |
| Potassium hydroxide, g | 120 | 120 | 120 | 120 | 120 | 120 |
| Step I: | | | | | | |
| Vinyl toluene,[3] g | 1,000 | 1,000 | 1,000 | 1,000 | 1,000 | 1,000 |
| Divinyl benzene (50%),[3] g | 200 | 200 | 300 | 200 | 300 | 200 |
| Potassium persulfate, g |  |  | 25 | 25 | 25 | 25 |
| Sodium sulfite, g |  |  | 10 | 10 | 10 | 10 |
| Cumene hydroperoxide, g | 25 | 25 |  |  |  |  |
| Ferrous sulfate, g | 7.6 |  |  |  |  |  |
| Potassium pyrophosphate, g | 8.4 |  |  |  |  |  |
| Tetraethylenepentamine, ml | 5 | 5 |  |  |  |  |
| Reaction temp. ° C | 72 | 75 | 75 | 75 | 76 | 75 |
| Reaction time, hrs | 3 | 2 | 3 | 3 | 3 | 3 |
| Total solids, percent wt | 10.2 | 10.7 | 11.7 | 11.7 | 11.7 | 11.1 |
| Precoagulum | Some | Some | None | None | None | None |
| Step II: | | | | | | |
| Vinyl toluene, g | 360 | 360 | 200 | 200 | 200 | 200 |
| Divinyl benzene (50%), g | 400 | 400 | 300 | 300 | 300 | 300 |
| AEVE,[4] g |  |  | 200 |  | 200 | 200 |
| BAEMA,[5] g |  |  |  | 200 |  |  |
| Tung oil (raw), g | 40 | 40 |  |  |  |  |
| Cumene hydroperoxide, g | 25 | 25 | 30 | 30 | 30 | 30 |
| TEPA, ml. tetraethylene-pentamine | 10 | 10 | 5 | 5 | 5 | 5 |
| Reaction temp. ° C | 70 | 75 | 70 | 70 | 70 | 70 |
| Reaction time, hrs | 19 | 18 | 19 | 18 | 13 | 10 |
| Total solids, percent wt | 15.05 | 15.5 | 14.8 | 15.4 | 14.5 | 14.6 |
| Conversion, percent wt | 91.0 | 94.0 | 89.5 | 93.5 | 88.0 | 88.5 |
| Latex appearance | ([6]) | ([6]) | ([7]) | ([7]) | ([7]) | ([7]) |

[1] #S-127 is a styrene-maleic anhydride-acrylonitrile copolymer (ratio 50/48/2).
[2] Commercial product.
[3] Commercial product.
[4] Aminoethyl vinyl ether.
[5] t.-Butylaminoethyl methacrylate.
[6] Precoagulum.
[7] No precoagulum.
*Polymerized in a 22 liter glass kettle.

In lieu of carrying out the polymerization by procedure B above, such may be effected by procedure A above. Thus the Step I polymerization of any of examples 1 through 11 may be carried out to a monomer-to-polymer conversion of about 30 to 70% and preferably 50–60% and Step II cross-linking polymerization may then be initiated and carried out by adding the monomer soluble catalyst without addition of further monomer material.

Further during the non-cross-linking Step I under either procedure A or B additional like or different monomer and catalyst materials may be added.

The polymerization in the examples heretofore has been carried out batchwise, however, it is understood that such polymerization may be carried out continuously either in a series of reactors or in a tube reactor having a series of inlets spaced along the flow path of the polymerizing materials.

*Example 12*

In a vessel are combined 200 g. of the aqueous dispersion of vinylic filler prepared by multi-step polymerization according to Example 1 heretofore with 200 g. of natural rubber latex (60% total solids) and 1.5 g. of Polygard (a trademark antioxidant product comprising tri(nonylphenyl) phosphite, a mixture of alkylated aryl phosphites and thoroughly mixed. The resulting product is an aqueous dispersion of natural rubber and vinylic filler, usable for various purposes as will be evident to those skilled in the art.

*Example 13*

The solids of the blend of Example 12 are separated from the aqueous phase in any suitable way, e.g. the latex filler combination are prepared in the same manner as set forth in British Patent No. 799,043.

*Example 14*

In place of the 120 g. of natural rubber employed as latex in Examples 12 and 13 may be employed a similar quantity of other rubbery polymers e.g. butadiene-styrene rubbery copolymer (GR–S 1500), butadiene-acrylonitrile copolymer (Hycar 1513) butyl rubber latex, etc., and likewise these elastomer-vinylic filler combinations can be compounded and vulcanized in the same manner as set forth in British Patent No. 799,043.

*Example 15*

Further in any of Examples 12 through 14 the 57 g. of vinylic filler as aqueous dispersion may be replaced by any of the vinylic fillers set forth in Examples 2 through 11 above.

*Example 16*

A latex of vinyl chloride-vinylidene chloride copolymer (latex #744B) in the amount of 35 g. (dry solids basis) is combined with 400 g. of vinylic filler latex from Example 7 heretofore and while mixing these ingredients there are added 20 g. of dioctyl phthalate and the resulting latex composition is useful per se.

*Example 17*

The latex composition of Example 16 with or without the added plasticizer (dioctyl phthalate) is coagulated by adding thereto while agitating 500 ml. of 2% sulfuric acid aqueous solution. The product is water washed and dried. This plastic composition can be molded.

Example 18

The vinyl chloride-vinylidene chloride in Examples 16 and/or 17 can be replaced by other plastomers in similar amounts such as polymethyl methacrylate, poly-n-butyl acrylate, styrene-butadiene copolymer (80/20 ratio). Other combinations of vinylic fillers and plastic and/or elastic materials as set forth in British Patent No. 799,043 can likewise be prepared.

Example 19

An unsaturated hydrophilic polymer is prepared by polymerizing in a pressure vessel 50 g. of methacrylic acid and 50 g. of butadiene in 500 g. of toluene and 100 g. of carbon tetrachloride to which is added 0.5 g. of butyl mercaptan and 1.5 g. of benzoyl peroxide and the polymerization is carried out at 115° C. for 2 hours. The resulting butadiene-methacrylic acid copolymer is recovered and 50 g. thereof is dissolved in 400 ml. of water containing 12 g. of sodium hydroxide. To this viscous solution of the sodium salt of the butadiene-methacrylic acid copolymer is added 350 gr. of the vinylic filler latex from Example 8 heretofore.

Vinylic fillers in aqueous solutions of unsaturated airdrying polyelectrolytes as here exemplified, can be used as coating compositions and when such are prepared sufficiently concentrated and properly formulated as with pigments, etc. such are useful as latex paints. Likewise aqueous solutions of saturated polyelectrolytes can be combined with the vinylic fillers hereof. Thus, in place of the butadiene-methacrylic acid copolymer sodium salt aqueous solution employed above can be substituted a similar quantity of other water soluble polyelectrolytes such as those setforth in Examples 1 through 20 of copending U.S. application No. 53,068 filed Aug. 31, 1960 entitled, "Vinylic Fillers Prepared With Polymeric Emulsifiers and Uses Thereof." (Case V P.E.)

In a like manner dispersions of polyelectrolytes may be employed including those dispersions and solutions set forth in U.S. Patents Nos. 2,047,398, 2,625,529 and other known polyelectrolytes.

While the use of vinylic fillers prepared by the novel processes hereof have been exemplified with elastomers, plastomers and polyelectrolytes, it is to be understood that such vinylic fillers can be employed with various combinations of these non-cross-linked polymers.

As above indicated, if the emulsion polymerization of the vinylic fillers for any of the above examples is conducted in a manner in which all monomer material is added at once, then the cross-linking monomer soluble organic free radical generating catalyst is best added after at least about one half the monomer material is polymerized with the aid of a non-cross-linking aqueously soluble polymerization catalyst system. If the monomer material is added step wise or continuously, then at least about one half of the total monomer material added or contemplated to be added is polymerized with a non-cross-linking polymerization recipe, followed by addition of the cross-linking monomer soluble organic free radical generating catalyst and the remaining monomers, and polymerization to a vinylic filler latex free of precoagulum. This multi-step process may be carried out in a batchwise or in a continuous manner and both processes provide vinylic filler latices free of precoagulum.

While there has been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and all modifications that come within the meaning and range of equivalency of the claims are intended to be included therein.

I claim:
1. In the production of rubbery polymer reinforced with cross-linked insoluble organic filler material, the process which comprises (I) reducing precoagulum in the filler material by
   (a) emulsifying in water a mixture comprising
      (i) polymerizable unsaturated monomer material consisting essentially of monomer containing and polymerizable through a plurality of nonconjugated $>C=C<$ groups, and in which any conjugated diene monomer present does not exceed 22% by weight of the monomer material,
      (ii) a free radical generating catalyst which is water soluble, and
      (iii) an emulsifying material
   (b) subjecting the so formed mixture to a first polymerization step whereby on the average but one of said plurality of $>C=C<$ groups reacts, thus producing a reaction product comprising essentially an emulsion of individual polymer particles which are
      (i) essentially non-cross-linked, and
      (ii) essentially soluble in dimethyl formamide,
   (c) adding to the reaction product of step (b)
      (i) an additional quantity of polymerizable unsaturated monomer material consisting essentially of monomer containing and polymerizable through a plurality of nonconjugated $>C=C<$ groups, and in which any conjugated diene monomer present does not exceed 22% by weight of the monomer material, and
      (ii) a second free radical generating catalyst which is monomer soluble, and
   (d) subjecting the mixture produced by step (c) to a second polymerization step to form an emulsion of organic filler particles which are
      (i) in the size range of about 5 millimicrons to 0.5 micron average diameter,
      (ii) rigid, and
      (iii) cross-linked to such extent as to be insoluble in dimethylformamide, and (II) incorporating in the rubbery polymer the filler particles produced in step (d).

2. A process as claimed in claim 1, said additional quantity of said monomer material comprising different monomer material than that subjected to the first polymerization step (b).

References Cited by the Examiner

UNITED STATES PATENTS

| | | | |
|---|---|---|---|
| 2,273,891 | 2/1942 | Pollack et al. | 260—78.5 |
| 2,474,807 | 7/1949 | Schoene | 260—880 |
| 2,524,685 | 10/1950 | Tawney | 260—875 |
| 2,614,093 | 10/1952 | Wheelock | 260—888 |
| 2,694,692 | 11/1954 | Amos et al. | 260—880 |
| 2,876,203 | 3/1959 | Miller et al. | 260—23.7 |
| 2,958,673 | 11/1960 | Jen | 260—881 |
| 2,963,453 | 12/1960 | Hwa et al. | 260—86.1 |

FOREIGN PATENTS 799,043   7/1958   Great Britain.

OTHER REFERENCES

Alfrey et al.—Copolymerization, Interscience Publishers, N.Y. (1952), pp. 161, 164 and 180–182 relied upon, copy in Scient. Lib., QD 281 P6A5C.

MURRAY TILLMAN, *Primary Examiner.*

L. J. BERCOVITZ, D. ARNOLD, *Examiners.*

G. F. LESMES, J. W. SANNER, *Assistant Examiners.*